No. 614,306.  
A. J. & J. P. MASON.  
BELT CONVEYER.  
(Application filed Dec. 31, 1897.)  
Patented Nov. 15, 1898.
(No Model.)
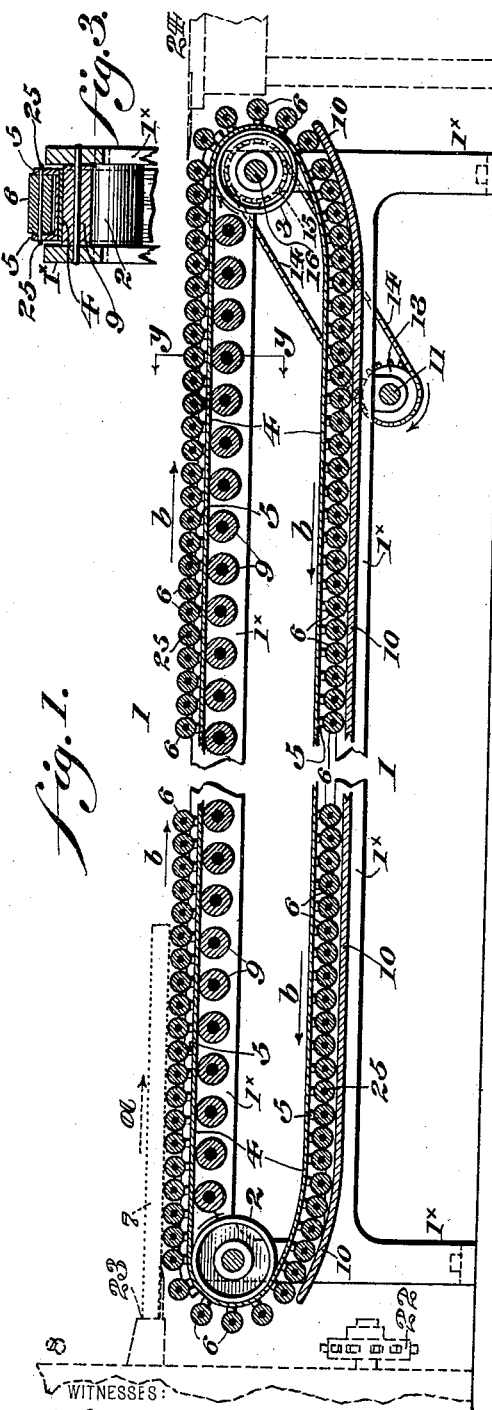
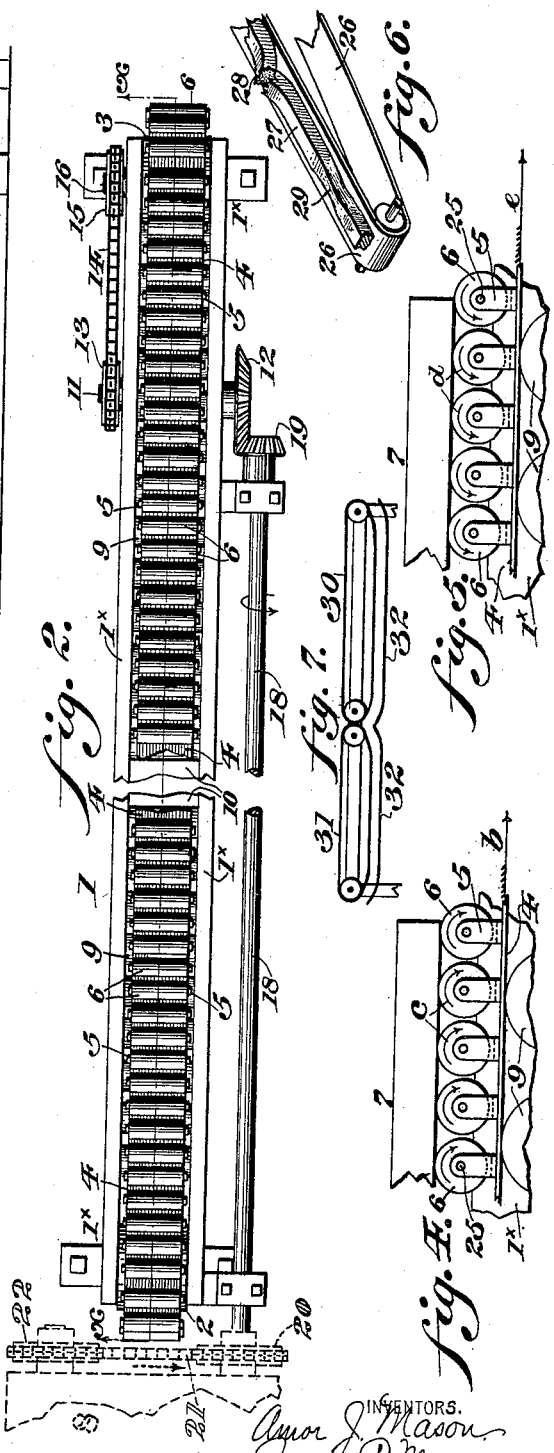

UNITED STATES PATENT OFFICE.

AMOR J. MASON AND JAMES P. MASON, OF PHILADELPHIA, PENNSYLVANIA, ASSIGNORS, BY DIRECT AND MESNE ASSIGNMENTS, TO THE MASON MANUFACTURING COMPANY, OF PENNSYLVANIA.

BELT CONVEYER.

SPECIFICATION forming part of Letters Patent No. 614,306, dated November 15, 1898.

Application filed December 31, 1897. Serial No. 665,092. (No model.)

*To all whom it may concern:*

Be it known that we, AMOR J. MASON and JAMES P. MASON, citizens of the United States, residing in the city and county of Philadelphia, State of Pennsylvania, have invented a new and useful Improvement in Belt Conveyers, which improvement is fully set forth in the following specification and accompanying drawings.

In the belt conveyers or endless aprons now in use when plastic material is fed to the same it will either be thrown off said conveyer or else be broken when it is fed at a greater speed than that at which the belt of the conveyer is traveling. On the other hand, when the plastic material is fed in the form of a bar from a suitable apparatus to the belt of a conveyer and at a speed less than that at which said belt is traveling the bar will either be reduced in cross-sectional area at different points along its length or else it will be broken or otherwise injuriously affected, and to this end our invention relates to improvements in belt conveyers or endless aprons; and it consists in a novel manner of constructing the same, so that any irregularity in the speed of plastic or other material fed in the form of a bar from a mixing and feeding apparatus of any suitable description will not injuriously affect said material.

It further consists of novel details of construction, all as will be hereinafter set forth, and particularly pointed out in the claims.

Figure 1 represents a vertical section of a conveyer embodying our invention, the section being taken on line $x\,x$, Fig. 2. Fig. 2 represents a plan view of the conveyer, showing also the mechanism for driving the same. Fig. 3 represents a transverse vertical section on line $y\,y$, Fig. 1. Figs. 4 and 5 represent side elevations of certain of the parts shown in Figs. 1 and 2 on an enlarged scale. Fig. 6 represents a perspective view of a portion of a belt conveyer or endless apron as ordinarily constructed and illustrates some of the defects which result when such conveyer is employed. Fig. 7 represents a side elevation of a modification.

Similar numerals of reference indicate corresponding parts in the figures.

Referring to the drawings, 1 designates a conveyer, consisting of a frame $1^\times$, having journaled therein the pulleys 2 and 3, over which is passed an endless belt 4, which has secured thereto brackets 5, in which are journaled the rollers 6, on which rests a bar 7 of plastic material fed from a mixing and feeding apparatus 8 of any suitable description or construction.

Journaled in the frame $1^\times$ are rollers 9, over which travels the belt 4, the object of said rollers being to prevent said belt from sagging. In the present instance the frame $1^\times$ is provided with a platform 10, on which travel the rollers 6, the object of said platform being also to assist in preventing the belt 4 from sagging.

Journaled in the frame $1^\times$ is a shaft 11, which has secured thereto a bevel gear-wheel 12 and a sprocket-wheel 13, it being noted that a sprocket-chain 14 is passed over said wheel 13 and engages a sprocket-wheel 15, secured to a shaft 16, journaled in the frame $1^\times$, so that the motion imparted to the shaft 11 may be transmitted to the shaft 16, and consequently to the pulley 3, secured thereto, and over which passes the belt 4.

Journaled in the frame $1^\times$ is a shaft 18, which has secured thereto a bevel-pinion 19, which meshes with the bevel gear-wheel 12, so as to impart motion thereto, and consequently to the belt 4. In the present instance the shaft 18 has secured thereto a sprocket-wheel 20, which may be driven by a chain 21, engaging a sprocket-wheel 22, journaled upon the mixing and feeding apparatus 8 or elsewhere, it being apparent that said sprocket-wheel 22 may be driven by any suitable mechanism, so as to impart motion to the sprocket-wheel 20.

The operation is as follows: The mixing and feeding apparatus 8 may be of any suitable description, according to the nature of plastic material to be worked and formed into bars 7. The apparatus 8 when in operation forces the plastic or other material therein through the discharge-opening 23, as seen in Fig. 1, and causes the same to travel in the direction indicated by the arrow $a$ in said Fig. 1, thus causing said material to reach the rollers 6 and be carried thereby toward a receptacle 24, which may be of any suitable description, according to the nature of the plastic material fed from the apparatus 8. When motion is imparted to the sprocket-wheel 22, the same will be transmitted by the chain 21 to the wheel 20, shaft 18, and bevel-pinion 19, and the latter will rotate the bevel-wheel 12, shaft 11, and the sprocket-wheel 13 thereon, and the latter, owing to the chain 14, will transmit motion to the wheel 15, shaft 16, pulley 3, and consequently to the belt 4, and cause the same to travel in the direction indicated by the arrows $b$ in Figs. 1 and 4, it being apparent that the rollers 6, carried by said belt 4, will travel in a similar direction and convey the bar 7 of plastic material from the discharge-opening 23 to the receptacle 24, from which it may be removed to any desired point. When the conveyer 1 is in operation, the belt 4 and rollers 6 thereon travel in the direction indicated by the arrows $b$ in Fig. 1 and at a uniform speed. Plastic material, generally speaking, is not of uniform consistency, since some parts are softer than others, and consequently offer less resistance when being worked, and especially so in brick-making. Assuming the bar 7 of plastic material to be one of clay for brick-making, it will be evident that the material forced through the discharge-opening 23 will escape therethrough faster when the material is soft than it will when it is tough. The belt 4 and rollers 6 thereon, as hereinbefore stated, travel at a uniform speed. Consequently when the bar 7 of plastic material is fed to said rollers 6 the latter will not rotate on their journals 25, provided the speed of the feeding of said bars 7 by the apparatus 8 and the speed of the belt 4 are the same. When a soft portion of the plastic material is passing through the discharge-opening 23 of the apparatus 8, the bar 7 will travel faster than the belt 4 and cause the rollers 6 to rotate on their journals 25 and in the direction indicated by the arrows $c$ in Fig. 4, and as the rotation of said rollers 6 reduces the resistance in a direction opposite to that indicated by the arrow $a$ in Fig. 1 to a minimum it will be evident that the bar 7 will travel forward or in the direction indicated by the arrow $a$ at an increased speed without being injuriously affected. When a tough portion of material is being forced through the discharge-opening 23 of the apparatus 8, the same will exert a pull or drag upon the bar 7, due to the material from said apparatus 8 being fed to the rollers 6 at a speed less than that which the belt 4 is traveling, and when this is the case the bar 7 will cause the rollers 6 to rotate on their journals 25 and in the direction indicated by the arrows $d$ in Fig. 5, and thereby reduce the friction due to the pull or drag caused by the tough material to a minimum and permit the belt 4 to travel in the direction indicated by the arrow $e$ in Fig. 5 at a greater speed than that at which the bar 7 is traveling and without causing injury to said bar.

When a conveyer consists of a belt 26, as seen in Fig. 6, without rollers thereon, it will be evident that a considerable amount of friction between the belt 26 and a bar 27 of plastic material will exist, due to the weight of said bar, and it will be evident that when the latter is fed to the belt 26 at a greater speed than that at which said belt is traveling said bar, not being sufficiently tough to force itself bodily along the belt, must necessarily bulge or buckle up at some point, as at 28 in Fig. 6, and be broken, thereby destroying that portion thereof, and as this defect will occur frequently the loss of time, &c., occasioned thereby is considerable. On the other hand, when the plastic material fed from the apparatus 8 is forced from the same at a speed less than that at which the belt 26 is traveling, a pull or drag will occur in the bar 27 at one or more points in its length and cause said bar to either become reduced in cross-section, as at 29, Fig. 6, by being stretched, due to the difference in the speed of the belt and bar, and it will also be evident that in some instances the bar 27 will be broken in addition to being stretched or reduced in cross-sectional area. The rollers 6, carried by the belt 4, prevent any possibility of a bar 7 from breaking, due to the varying speed at which said bar is fed, since the rollers 6 may be rotated by the bar 7 in either direction.

It will be evident that, if desired, the conveyer 1 may consist of two or more endless belts or aprons provided with rollers 6 and driven at different rates of speed, which is a desirable feature in certain kinds of work, the general relative position of said aprons being understood from Fig. 7, in which the aprons are indicated at 30 and 31 and have the platforms 32 and are actuated in substantially the same manner as already described.

It will of course be understood that the conveyer can be used for other purposes than for plastic materials—such as boards, boxes, cans, &c.—and is adapted for use as a feeder to machines, if desired.

Having thus described our invention, what we claim as new, and desire to secure by Letters Patent, is—

1. In a conveyer, the combination of a belt or endless apron, and rollers rotatably mounted thereupon; but capable of rotation independently of said apron.

2. The combination of an endless apron, brackets mounted on said apron, rollers journaled in said brackets and means for actuating said apron.

3. In an apparatus of the character named, a frame or housing, pulleys journaled therein, an endless belt passing over said pulleys, brackets carried by said belt, rollers journaled in said brackets, and devices located intermediate of and below said belt, for preventing the latter from sagging.

4. In an apparatus of the character named, an endless belt, brackets attached to said belt, rollers journaled in said brackets, other rollers suitably journaled and located below the upper portion of said belt, and a platform located below the under portion of said belt.

5. The combination of a mixing-machine 8, an endless belt, rollers rotatably mounted thereon, means for preventing said belt from sagging, pulleys over which said belt passes, a shaft on which one of said pulleys is mounted, a sprocket-wheel carried by said shaft, a second shaft having suitable bearings, a sprocket-wheel and a gear carried by said last-mentioned shaft, a chain common to said sprocket-wheels, a pinion meshing with said gear and means for rotating said pinion.

6. In a conveyer the combination of a belt or endless apron, and rollers mounted thereon having their peripheries entirely above said belt and capable of rotation independent thereof.

7. The combination of an endless apron, brackets mounted on said apron, rollers journaled in said brackets and having their peripheries entirely above said apron and means for actuating said apron.

8. In a conveyer, the combination of an apron or endless belt, brackets mounted thereon and extending at an angle therefrom and rollers journaled in said brackets out of contact with said belt.

AMOR J. MASON.
JAMES P. MASON.

Witnesses:
WM. C. WIEDERSHEIM,
GEORGE R. NEWBOLD.